United States Patent Office 2,740,720
Patented Apr. 3, 1956

2,740,720

METHOD OF FORMING A CONFECTION AND THE RESULTING PRODUCT

Artemy A. Horvath, Princeton, N. J.

No Drawing. Application January 26, 1953,
Serial No. 333,367

9 Claims. (Cl. 99—134)

This invention relates to confections.

A purpose of the invention is to incorporate as part of a confection nutritive contents that shall be long-lasting in one's mouth, yet digest readily.

Much effort has been devoted to aspects of embodying fat in candy and the like, but little has been accomplished to improve the inherent nutritious aspects of candy. Of course, it is recognized generally that sugars constitute the basic component of candy and that sugars generally are nutritious. The food value of candy is diminished, however, by the high concentrations of such sugar contents with their resulting burdens on the digestive faculties. Various additives sometimes lend their own nutritive qualities to candy, such as nuts or fruits for example; but this invention utilizes the sugar base of confections as an effective medium to develop the slow-dissolving properties here obtained. This relation of the components of this invention to the medium should be distinguished from a mere mechanical intermixture of substances.

In this application the term confection may be used interchangeably sometimes with the termy candy but generally somewhat more broadly. Confection may include hard lozenges that embody medicaments, or may include special flavors or fillings or coatings. It may be true that in many applications water will be present in greater or less amount, but the menstruum in this invention nevertheless is essentially of sugar.

It is recognized, further, that many confections include milk, or that many confections include eggs, or possibly various other ingredients that were intended to add some property or other. Such additives should be distinguished from this invention as being sugar extenders in some form, as for example fluffing or whipping agents or modifiers of sugar crystals, or as already noted to embody fat in the candy. Under this invention, physical chemical action in the sugar medium of a confection produces a long-lasting nutritive complex. Sometimes this complex may be not only stabilized or promoted by the saccharine medium but may also include such medium in its complex.

Various benefits of this invention, and various problems involved in this complicated field of nutrition, will become more apparent as this description proceeds. Specific examples presented to illustrate this invention are not intended to be limiting, however, nor to exclude alternatives within the scope of the appended claims.

Under this invention certain vegetable protein is combined with lecithin to form a complex that is insoluble in water. Under this invention, further, this complex may be extended throughout the sugary medium of confections for gradual ingestion as a nutritive composition. The sugar is regarded as a special medium for which this particular protein-lecithin complex has an affinity. Indeed this complex evidently combines with the sugar to yield a composition in which some of the sugar also is rendered less soluble in water. The result of either complex is a composition that lasts longer in one's mouth and so supplies slowly through the salivary juices a source of exceptionally high nutritive values.

More particularly, the protein here utilized is of special nature, best described by its general method of preparation. As a source of this protein are the various oleaginous seeds, but especially those known as soya or sometimes popularly as soybeans. To obtain the vegetable protein in form or kind to combine with lecithin under this invention, the soya is given special treatment. The soya is extracted with ethyl alcohol of about 95 or more percent, preferably at about the boiling point of the alcohol. This extraction removes oil and certain flavoring and coloring substances that would otherwise remain bound in the proteinaceous residue. Of most importance, however, the alcohol treatment prepares the protein for subsequent bonding to the phosphatide; that is, to the lecithin. Evidently the alcohol frees or exposes certain reactive or receptive groups of this vegetable protein. There are various indications of change wrought in the protein by the alcohol extraction. Be that as it may, under this invention lecithin is combined with this treated protein to form a product that is relatively insoluble in water. The soya or soya meal treated with alcohol may be combined with the lecithin or after the alcohol treatment the protein may be extracted with water and so used. Or it may be separated from the water and then used. It is suitable to use so-called soya flakes. These are a commercial form of alcohol-extracted soya.

Lecithin for this invention may be of commercial forms. Present-day lecithin is obtained principally from oil of the oleaginous seeds; soya is an important source but corn, cottonseed, peanuts and many others are sources. Preferably the lecithin is purified to remove such impurities as oil, sterols, waxes and some coloring. Purified commercial lecithin is a granular solid, somewhat waxy and slightly yellow. It contains besides lecithin itself other phosphatides such as some cephalin and some lipositol. It is readily dispersible in water, but under this invention its complex with the alcohol-extracted soya protein is "insoluble" or only slowly dispersible, if at all.

The complex of lecithin-protein under this invention is formed by intimate contact of the components lecithin and protein. Favoring influences are heat and acid conditions but these may be minimized, with sacrifice of their advantages. The proportions of lecithin and of this protein are substantially equal, preferably, but since an adsorption complex evidently is involved these proportions may be varied considerably.

As an example, one procedure of this invention is to grind together, as in a mortar or analogous commercial mill, the commercial protein powder obtained from water extract of alcohol-extracted soya with an equal weight of commercial lecithin. The product is a solid with new physico-chemical properties. It has lost the gelling and foaming properties of the protein and has become insoluble in water or usual organic solvents. However, it does distribute through a sugar medium, such as candy.

As another example, the commercial protein powder obtained from water extract of alcohol-extracted soya is swelled in water. To it is added, say in equal quantity, a suspension-solution of commercial lecithin in ethyl alcohol. The two are mixed well and the liquids partially or entirely evaporated. The product is essentially as in the previous example. Instead of using the extracted protein, alcohol-extracted soya flour or soya flakes may be combined with the lecithin. These operations may be carried out at room temperature or above, having in mind that in the presence of water this protein denatures rapidly at temperatures of about 85° C. or more. For use in confections this product may simply be mixed with the sugar medium of the confection.

It is preferable however to form confections by adding the components lecithin and this protein to the sugary component near the close of any cooking period while yet adequate mixing is feasible. Many confections, for example, hard candies or pharmaceutical lozenges, are cooked to about 240° F. The lecithin and this protein, or their pre-formed complex, may be added near the end of this cooking.

In some confections, conditions of acidity may be such as to promote formation of the desired insoluble complex of lecithin-protein. For example, in chocolate confections the so-called Dutch process chocolate is of pH about 5.5. Consequently such chocolate is well-suited for this invention. In whatever confection, a range of pH from about 5 to about 6.5 affords suitable acidity to promote suitable forming or bonding of the complex herein described. Combinations of such range of acidity with sugar temperatures of about 220–250° F. are often most desirable.

As has been mentioned, the protein-lecithin complex of this invention is retained in a confection in relatively insoluble condition. Also, it appears to bind with it some of the sugary medium in which it is contained. Consequently a prolonged period is available for these components to become ingested. The confection lasts. The rate of feeding of this protein, lecithin and sugar becomes in effect relatively slow so in consequence the complex encounters digestive fluids at a more suitable rate for optimum nutritional utilization than would be if such highly concentrated food elements as protein, phosphatide and sugar were quickly dissolved and as quickly swallowed.

It is no part of this invention to rest on any theory. Nevertheless certain observations from the art involved may aid in illustrating the setting of this invention.

It is understood that proteins are complex bodies, that they may differ extensively in their build-up from simpler units, and that even a given protein may vary in its behaviour under various treatments. Certain ionic forces or polar groups may act from one part of a protein entity while quite opposite ionic forces may act from another part of the same entity. Or, certain attractive forces may predominate under certain pH conditions and quite different forces under other pH conditions. It seems that the present invention utilizes a vegetable protein of which certain ionic or adsorption surfaces have been made available by ethyl alcohol removal of various components or impurities and thus fitted especially to attract lecithin and sugar. The residual forces can adsorb or otherwise form with phospholipids to a degree that yields a relatively insoluble complex at least with respect to water. Nevertheless sugar can adsorb or otherwise combine in this given complex and likewise this insoluble complex can distribute readily and extensively throughout the sugar medium of confections.

As nutritional factors, phosphatides are exceedingly important. They are present in every animal and plant cell, but nitritional problems involve replenishing these factors or their components. For example, many varieties of lecithin are exceedingly labile and if isolated should be protected against oxidation, against combining with some of the metals, or against heat, for example. The present invention protects the phosphatide and in addition slows its presentation to digestive fluids to desirable rate; it thus aids in better nutritional use of phosphatides.

The protein utilized under this invention may have been largely of globulin type; from soya, or where soya meal or flakes are used, it may contain calcium and magnesium and even iron and copper and certain vitamin complexes. Soya protein favors formation of blood plasma, thus exhibiting some difference from other plant proteins, and soya protein reduces intestinal putrefaction by promoting development of gram-positive intestinal flora, thus exhibiting some difference from egg protein. The alkaline ash of soya protein in digestion minimizes breaking down of protein to keep proper acid-base balance. Thus a human organism can store three times as much nitrogen from soya as from meat protein. These are evidences of the unique nature of soya protein, which is preferred under this invention, and evidences of the desirability of supplying protein for nutrition in intimate association with the carbohydrate of candy.

It appears likely that the acid range preferred under this invention promotes the formation of stable complexes or coacervates between this protein and lecithin. Evidently this preferred range extends downward from about the pH 6.4 of negatively biased soya lecithin. These acid conditions also favor preservation of the cystine sulphur of the soya protein. Various solvents deteriorate and lose such sulfur, but the preliminary alcohol extraction here described appears to preserve this sulfur in the protein, in addition to clearing or activating the attraction properties of this protein for lecithin and also for sugar. Thus confection containing the nutritive complex under this invention is especially desirable.

In effect this invention utilizes certain simple protein of soluble nature to form certain conjugated insoluble proteids with phosphorus complexes and with sugar complexes, utilizing most effectively the sugar medium of confections as distributing agent.

The principles of this invention and their best mode of application now contemplated have been described and distinguished in accordance with the patent statutes so that those skilled in the art may use them, but other equivalent forms of this invention than those specifically illustrated are to be included within the scope of the appended claims.

What is claimed is:

1. As a new composition of matter, a confection comprising a sugar base having therein a complex of lecithin with the proteinaceous residue of ethyl alcohol-extracted soya.

2. As a new composition of matter, a confection comprising a sugar base of acidity in the range of substantially pH 5 to 6.5, having therein a complex of lecithin with the proteinaceous residue of ethyl alcohol-extracted soya.

3. As a new composition of matter, a confection comprising a sugar base with Dutch process chocolate, the acidity thereof being in the range of substantially pH 5 to 6.5, having therein a complex of lecithin with the proteinaceous residue of ethyl alcohol-extracted soya.

4. As a new composition of matter, a confection comprising a sugar base having therein substantially equal quantities of lecithin and ethyl-alcohol-extracted soya protein.

5. A process of forming a confection, comprising distributing in a sugar base a complex of lecithin with the proteinaceous residue of ethyl alcohol-extracted soya.

6. A process comprising grinding together lecithin and ethyl-alcohol-extracted soya protein, thereby forming a complex adapted to be distributed in a sugar base.

7. A process comprising swelling in water the proteinaceous residue of ethyl alcohol-extracted soya, mixing therewith an alcohol solution of lecithin, and removing liquid therefrom, thereby forming a lecithin-protein complex adapted to be distributed in a sugar base.

8. A process of forming a confection, comprising providing a sugar base of pH substantially 5 to 6.5 and mixing therein lecithin and protein from ethyl-alcohol-extracted soya.

9. A process of forming a confection, comprising mixing together a sugar base, lecithin and the proteinaceous residue of ethyl alcohol-extracted soya and heating to the order of 220° F.–250° F.

References Cited in the file of this patent

UNITED STATES PATENTS

| | | |
|---|---|---|
| 1,277,336 | Moskovits et al. | Aug. 27, 1918 |
| 1,859,240 | Jordan | May 17, 1932 |
| 2,444,241 | Beckel et al. | June 29, 1948 |
| 2,495,706 | De Voss et al. | Jan. 31, 1950 |

FOREIGN PATENTS

| | | |
|---|---|---|
| 129,165 | Great Britain | July 10, 1919 |

OTHER REFERENCES

"Lecitho-Protein," Industrial and Engineering Chemistry, vol. 27, No. 10, October 1935, pages 1222 and 1223.